United States Patent [19]
Whitney

[11] 3,766,472
[45] Oct. 16, 1973

[54] APPARATUS FOR ELIMINATION OF ERROR IN A DETECTING SYSTEM

[75] Inventor: John A. Whitney, Fort Wayne, Ind.

[73] Assignee: Franklin Electric Co., Inc., Bluffton, Ind.

[22] Filed: Nov. 2, 1971

[21] Appl. No.: 194,981

[52] U.S. Cl. .............................. 324/78 D, 177/210
[51] Int. Cl. ......................... G01r 23/02, G01g 3/14
[58] Field of Search .............. 324/78 D, 79 D, 99 D, 324/130, 119; 235/92 WT; 177/210

[56] References Cited
UNITED STATES PATENTS
3,665,169   5/1972   Henderson et al. ........... 235/92 WT

*Primary Examiner*—Alfred E. Smith
*Attorney*—Lowell C. Noyes et al.

[57] ABSTRACT

This disclosure deals with a system wherein the frequency of a signal having a variable frequency representative of a parameter is measured in order to make a determination of the parameter. The frequency of the signal is measured during a normal measuring mode of operation by counting the number of cycles of the signal occurring within a fixed time base. Prior to the normal measuring mode of operation, the operator initiates a set zero mode of operation, wherein the resolution of the measurement is increased by a predetermined ratio. At this increased resolution, any portion of a cycle, which is present but which would not be counted during the normal measuring mode of operation, is detected and is utilized to actuate a circuit for adjusting the frequency. The frequency is adjusted either upwardly or downwardly so that an integral number of whole cycles occurs during the time base, thereby eliminating said portion of a cycle.

10 Claims, 7 Drawing Figures

| INPUT PULSE NUMBER | "ONE" FLIP FLOP | "TWO" FLIP FLOP | "FOUR" FLIP FLOP | "FIVE" FLIP FLOP | MAGNETS TURNED ON | TOTAL ADDED FORCE |
|---|---|---|---|---|---|---|
| 0 CLEAR SIGNAL | CLEAR | CLEAR | CLEAR | CLEAR | .004 | .004 LB. |
| 1 | SET | SET | SET | CLEAR | .001 .002 | .003 LB. |
| 2 | CLEAR | SET | SET | CLEAR | .002 | .002 LB. |
| 3 | SET | CLEAR | SET | CLEAR | .001 | .001 LB. |
| 4 | CLEAR | CLEAR | SET | CLEAR | | .000 LB. |
| 5 | SET → CLEAR | SET → CLEAR | CLEAR → CLEAR | SET → SET | .004 .005 | OUTPUT PULSE TO REGISTER .009 LB. |
| 6 | SET | SET | SET | SET | .001 .002 .005 | .008 LB. |
| 7 | CLEAR | SET | SET | SET | .002 .005 | .007 LB. |
| 8 | SET | CLEAR | SET | SET | .001 .005 | .006 LB. |
| 9 | CLEAR | CLEAR | SET | SET | .005 | .005 LB. |
| 10 | SET → CLEAR | SET → CLEAR | CLEAR → CLEAR | CLEAR → CLEAR | .004 | .004 LB. |

APPARATUS FOR ELIMINATION OF ERROR IN A DETECTING SYSTEM

Systems are known in the art utilizing a signal having a variable frequency which is representative of a parameter. To make a determination of the parameter, the frequency may be measured by counting the number of cycles of the signal, occurring within the duration of a time base.

A difficulty encountered in a system of the foregoing character is that, usually, the time base does not terminate at the end of a full cycle. If the system counts only full cycles, the end count will be in error by a portion of a cycle, which falls within the time base but is not counted.

Further, the foregoing error may be compounded when it is also necessary to combine two signals before beginning a count. For example, in a weighing system wherein weight is represented by the frequency of a signal and the signal does not have zero frequency at zero weight, it may be necessary to subtract, before counting, a number of cycles to reduce the number of cycles occurring during the time base to zero with zero weight on the scale. This may be accomplished by first making a preliminary zero weight count of the cycles with zero weight on the scale, and then subtracting the zero weight count during each weighing operation.

If, however, the zero count is in error by a portion of a cycle for the reason discussed above, and the weight count is also in error by a portion of a cycle for the same reason, the two errors when added together might produce an excessively erroneous measurement. It is therefore an object of this invention to reduce the foregoing error.

A system in accordance with the present invention comprises a zero setting circuit which receives the variable frequency signal and receives a time base setting signal, the zero setting circuit increasing the measurement resolution by increasing, according to a predetermined ratio, one of the two signals relative to the other signal, determining at said increased resolution the amount of any portion of a cycle occurring within a normal resolution time base but that would not be counted, utilizing said determination to change the frequency of said variable frequency signal to eliminate said portion of a cycle, reducing said resolution by said ratio, and counting the number of full cycles occurring within said time base. Subsequently, when making measurements the above count is subtracted from the number of cycles of the variable frequency signal in each measuring operation.

Other objects, features and advantages of the invention will be apparent from the following detailed description taken in conjunction with the accompanying figures of the drawings, wherein.

While the invention described herein has utility in other fields, it is described herein in connection with a weighing system.

Figure 1:
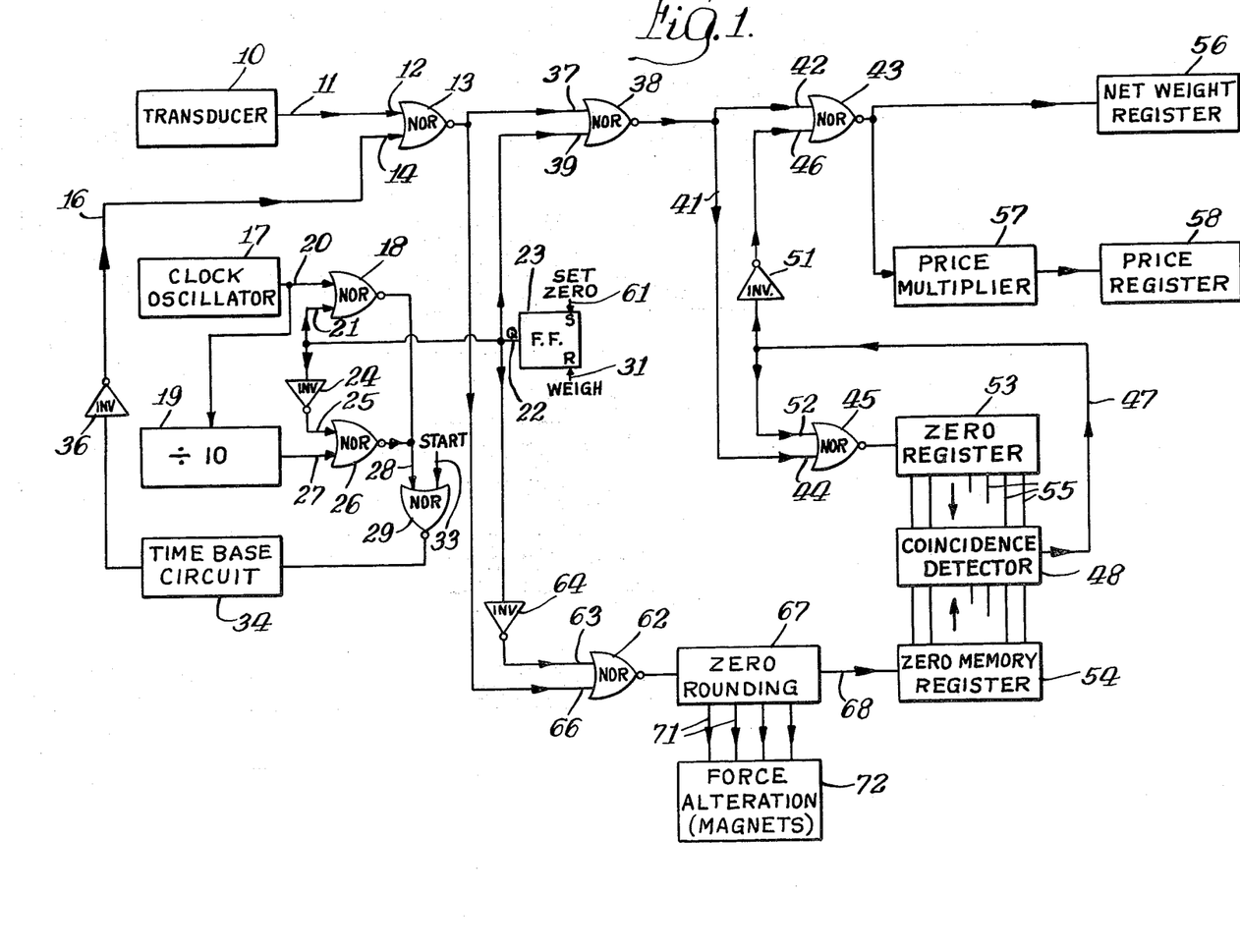
FIG. 1 is a block diagram of a system embodying the invention.

With reference to FIG. 1, the reference numeral 10 represents a transducer which produces a signal having a variable frequency that is directly proportional to a parameter being measured. In the case of a weighing system, transducer 10 may be a weight sensing cell of the character described in detail in the A.L. Streater et al. U.S. application Ser. No. 89,736, filed Nov. 16, 1970, now U.S. Pat. No. 3,712,395. The transducer 10 produces a signal having a frequency which is other than zero when the weight on the cell is zero. In other words, with no weight on the weight receiving pan, the signal at the output 11 of the transducer may, for example, be in the range of 125 Hz. Since each cycle of the signal represents a unit of weight, it is necessary to subtract the zero weight frequency before making a weight measurement, as will be described. The transducer 10 produces a sine wave which is preferably converted to a symmetrical square wave as by passing the sine wave through an amplifier and a clipper. The high portion of the square wave is logic one and the low portion is logic zero.

The output 11 is connected to an input 12 of a NOR gate 13 which has a second input 14 connected to receive a time base signal on a conductor 16. The circuit for generating the time base signal may be of the character described in the copending application of P.F. Sorensen, Ser. No. 194,986, filed Nov. 2, 1971. Generally, the time base generating circuit includes a clock oscillator 17 which has its output 20 connected to a NOR gate 18 and to a circuit 19 for dividing the oscillator 17 output by, in the present illustration, a factor of ten. The circuit 19 may be a conventional circuit arrangement such as a series of connected flip-flops which produces one output pulse for every 10 incoming pulses. The gate 18 has a second input 21 connected to the Q output 22 of a set zero flip-flop 23. The Q output is also connected through an inverter 24 to an input of another NOR gate 26 which has another input 27 connected to the output of the divide by ten circuit 19. The outputs of both gates 18 and 26 are connected to an input 28 of still another NOR gate 29.

Briefly, the oscillator 17 produces a train of pulses on its output 20. To condition the scale for a normal weighing mode of operation, an operator of the scale resets the flip-flop 23, as by closing a switch which is connected to a reset input 31 of the flip-flop 23. Resetting of the flip-flop 23 causes the Q output 22 to fall to logic zero, causing a zero, or low, signal to appear at the input 21 of the gate 18 and a one, or high, signal, due to the inverter 24, to appear at the input 25 of the gate 26. The high signal at the input 25 turns off the gate 26 whereas the low signal at the input 21 turns on the gate 18, and pulses from the oscillator 17 flow through the gate 18 to the input 28 of the gate 29.

To initiate a normal weighing operation, a low signal, which may be initiated either manually as by pressing a button or automatically by an associated circuit (not shown), is produced on an input 33 of the gate 29. The low signal at the input 33 turns on the gate 29 and the oscillator pulses flow to a time base circuit 34 which has its output connected through an inverter 36 to the conductor 16. As described in the above-mentioned Sorensen application, the time base circuit 34 produces a time base signal having a predetermined time duration, the signal being initiated essentially in synchronism with the leading edge of one of the cycles of the square wave at the output 11 of the transducer 10. The circuit 34 includes a counter which counts the number of oscillator 17 cycles until the capacity of the counter is reached. The time duration of the time base signal is thus determined by the frequency of the oscillator 17 and the capacity of the counter.

During the normal weighing mode of operation, the transducer 10 pulses pass through the NOR gate 13 as soon as the signal at the input 14 shifts to logic zero. This shift occurs at the beginning of the time base signal which, although it is a logic one signal, is inverted by the inverter 36. With the input 14 low during a time base signal, the transducer 10 square wave signal passes through the gate 13 to an input 37 of another NOR gate 38 which has a second input 39 connected to the Q output 22 of the flip-flop 23. As previously mentioned, the Q output 22 is low when the flip-flop 23 is reset during the normal weighing mode of operation, and therefore the NOR gate 38 is also turned on and the square wave passes through the NOR gate 38 to a conducter 41. The conductor 41 is connected to an input 42 of a NOR gate 43 which has a second input 46 connected through an inverter 51 to an output 47 of a coincidence detector circuit 48. The output 47 is also connected to an input 52 of a NOR gate 45 which has a second input 44 connected to the conductor 41. The output of the NOR gate 45 is connected to an input of a zero register or counter 53 which has a plurality of interconnections, indicated by the number 55, with the coincidence detector 48. Prior to operation in the weighing mode, a zero weight count is stored in a zero memory register 54, which count corresponds to the frequency of the transducer 10 when there is zero weight on the scale, as will be explained hereinafter.

Assuming that a zero weight count has been stored in the register 54, this count is compared by the coincidence detector 48 with the count being accumulated in the zero register 53. When the register 53 count reaches the register 54 count, the coincidence detector 48 generates a logic one signal on the conductor 47 which turns off the gate 45 and turns on the gate 43. Thus, the count in the register 54 is subtracted, during each time base signal, from the number of cycles of the square wave, occurring during the time base signal. The pulses from the transducer 10 then pass through the gates 13, 38 and 43 to a weight register 56 which counts the number of pulses received by it and produces an output in the form of a visual indication of the weight or in the form of a signal which controls a printing mechanism. The gate 43 output is also passed to a price multiplier 57 which multiplies the weight representative square wave by a signal representing the cost of an article per unit of weight. The multiplied figure is passed to a price register 58 which also produces either a visual output or a signal which controls a printing mechanism.

As previously mentioned, prior to a normal weighing operation, a zero weight count is stored in the register 54, which count represents the number of cycles of the transducer 10 signal, occurring during a time base signal, without an article to be weighed on the scale. This is accomplished by setting the flip-flop 23, as by an operator pressing a set zero button connected to the set input 61 of the flip-flop 23. When the flip-flop 23 is set, the Q output 22 is high, the gate 38 is turned off, the gate 18 is turned off, and the gate 26 is turned on, causing the signal from the oscillator 17 to flow through the divide by 10 circuit 19 and through the gate 26. During a set zero operation a logic zero start signal is also provided on the input 33 of the gate 29, turning the gate 29 on and enabling the signal of the circuit 19 to flow to the time base circuit 34.

As previously mentioned, the circuit 19 produces one output pulse for every ten pulses received by it from the oscillator 17. Since the time duration of the time base signal produced by the circuit 34 is dependent in part upon the number of cycles received by it from the clock oscillator 17, the length of the time base signal is 10 times longer than the length of the time base signal produced during the normal weighing mode of operation when the divide by 10 circuit 19 is disabled. The extended time base signal holds the gate 13 on 10 times longer than it is on when the scale is in its normal weighing mode of operation, and therefore 10 times as many transducer 10 cycles pass through the gate 13. If during the normal weighing mode of operation, each transducer 10 cycle represents one unit of weight, then during the set zero mode of operation each transducer 10 cycle represents one-tenth the foregoing unit of weight. The divide by ten circuit may therefore be considered a resolution increasing means because it increases the accuracy to which the weight may be determined. It should be apparent that a similar increase in resolution could be obtained by multiplying the transducer 10 frequency and holding the time base signal constant.

Setting of the flip-flop 23 during the set zero mode of operation closes the gate 38 and turns on another gate 62 which has an input 63 connected through an inverter 64 to the Q output 22 of the flip-flop 23. The NOR gate 62 has another input 66 connected to the output of the gate 13 to receive a transducer 10 signal when a time base signal is present. Thus, setting of the flip-flop 23 turns on the gate 62 permitting the transducer 10 signal to flow to a zero rounding or divide by 10 circuit 67. The construction and operation of the circuit 67 will be discussed hereinafter in detail. The circuit 67 has an output 68 connected to the input of the zero register 54, and a single pulse appears at the output 68 for every 10 pulses received by the circuit 67. Since, in the set zero mode of operation, the time base signal is ten times the length of a normal time base signal, dividing the number of pulses by ten in the circuit 67 results in the register 54 receiving substantially the same number of transducer 10 cycles as would be produced during a normal length time base signal.

It will be apparent that since the register 54 counts every tenth cycle, a remainder may be left in the circuit 67 at the end of a time base period, such remainder corresponding to the previously mentioned portion of a cycle by which the register or counter may be in error. As will be explained hereinafter, such a remainder in the circuit 67 causes signals to appear on a plurality of output conductors 71 of the circuit 67, these signals causing actuation of one or more force producing devices which, in the present instance, are electromagnets 72. The electromagnets 72, when energized, adjust the frequency of the signal appearing at the output 11 of a transducer 10 so that an integral number of cycles fall within the time base period. Thus, the register 54 will receive an integral number of cycles, thereby eliminating any error due to an uncounted portion of a cycle.

Figure 2:
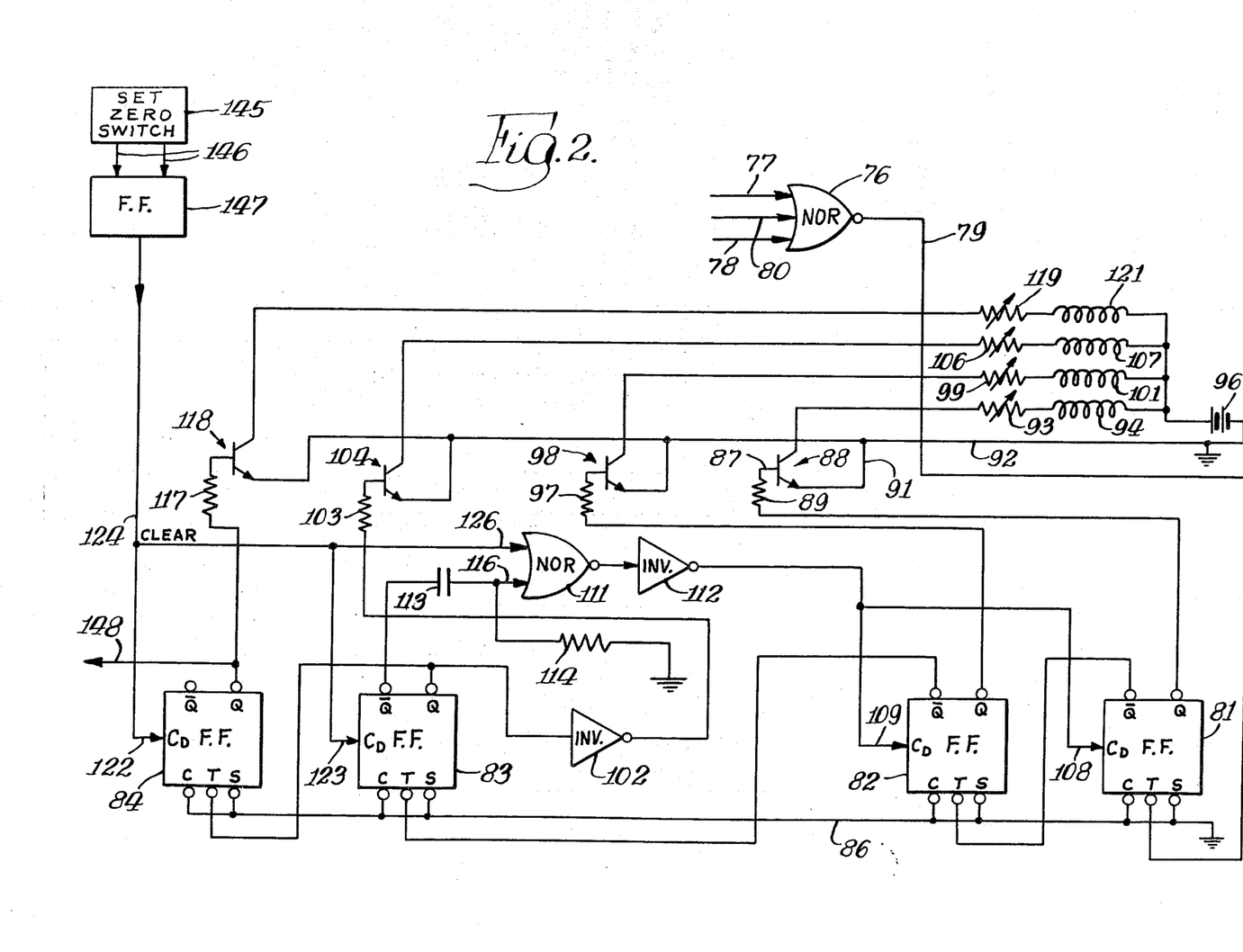
FIG. 2 is a detailed diagram of a portion of the system.

The divide by 10 circuit 67 is illustrated in greater detail in FIG. 2, and comprises a NOR gate 76 which corresponds generally to the gate 62, and has one input 77 connected to receive the square wave and a second input 78 connected through the inverter 64 (FIG. 1) to receive the flip-flop 23 output. The gate 76 may have a third input 80, not indicated in FIG. 1, connected to receive the inverse extended time base signal appearing on the conductor 16. The square wave output of the gate 76, when the inputs 78 and 80 are at logic zero during the set zero mode, appears on a conductor 79 which is connected to the T input of a J-K flip-flop 81. The circuit further includes three additional J-K flip-flops 82, 83 and 84. Each of the flip-flops 81 to 84 also has a C and S terminal connected to ground by a conductor 86. The Q output of the flip-flop 81 is connected to the base 87 of an NPN transistor 88 through a resistor 89. The emitter of the transistor 88 is connected by a conductor 91 to a ground conductor 92, and the collector of the transistor 88 is connected through a variable resistor 93 and the coil 94 of an electromagnet to a DC supply 96.

The $\bar{Q}$ output of the flip-flop 81 is connected to the T input of the next flip-flop 82 which has its Q output connected through a resistor 97 to the base of another transistor 98. The emitter of the transistor 98 is also connected to the ground conductor 92, and the collector of the transistor 98 is connected through a variable resistor 99 to the coil 101 of another electromagnet.

The $\bar{Q}$ output of the flip-flop 82 is connected to the T input of the flip-flop 83 which has its Q output connected through an inverter 102 and a resistor 103 to the base of still another transistor 104. The emitter of the transistor 104 is connected to the ground conductor 92 and its collector is connected to another variable resistor 106 and the coil 107 of still another electromagnet. The $\bar{Q}$ output of the flip-flop 83 is connected to the clear inputs 108 and 109 of the flip-flops 81 and 82 through a NOR gate 111 and an inverter 112. An RC pulse shaping circuit including a capacitor 113 and a resistor 114 is connected to the $\bar{Q}$ output of the flip-flop 83 and produces a pulse at an input 116 of the NOR gate 111, and this pulses produces a forced clear signal on the inputs 108 and 109 of the flip-flops 81 and 82 when the flip-flop 83 is cleared, as will be explained.

The Q output of the flip-flop 83 is also connected to the T input of the flip-flop 84, and the Q output of the flip-flop 84 is connected through a resistor 117 to the base of another transistor 118. The emitter of the transistor 118 is connected to the ground conductor 92 and the collector of the transistor 118 is connected through another variable resistor 119 to the coil 121 of still another electromagnet. The ends of the coils 94, 101, 107 and 121, which are opposite the variable resistors, are all connected to the DC supply 96. The clear inputs 122 and 123 of the flip-flops 84 and 83 are connected to receive a clear signal on a conductor 124, the conductor 124 also being connected to another input 126 of the NOR gate 111.

At the beginning of a zero setting operation, a logic one clear signal is provided on the conductor 124 which clears or resets the four flip-flops 81 to 84. Thus, the Q outputs of the four flip-flops are low and their $\bar{Q}$ outputs are high. The low signals on the Q outputs of the flip-flops 81, 82 and 84 result in the three transistors 88, 98 and 118 being biased off, and consequently there is no current flow through the three coils 94, 101 and 121. The transistor 104 is however biased on because the low Q output of the flip-flop 83 is inverted by the inverter 102. With the transistor 104 being biased on, current flows through the coil 107.

Figure 4:
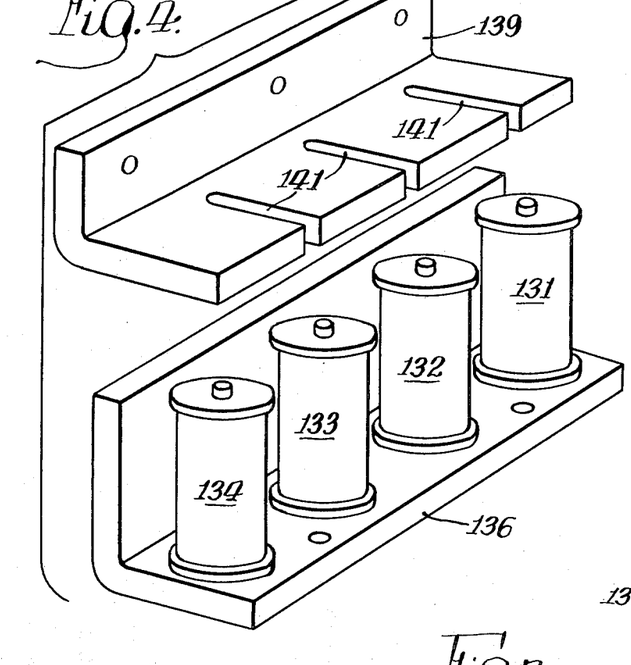
FIG. 4 is an exploded view of a magnet structure in accordance with the invention.
Figure 5:
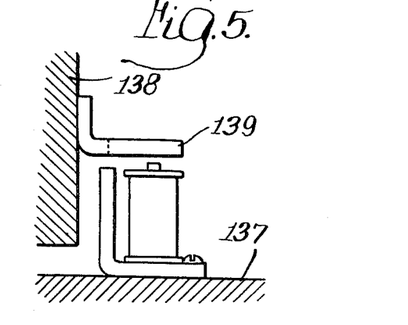
FIG. 5 is an end view of the structure shown in FIG. 4.
Figure 6:
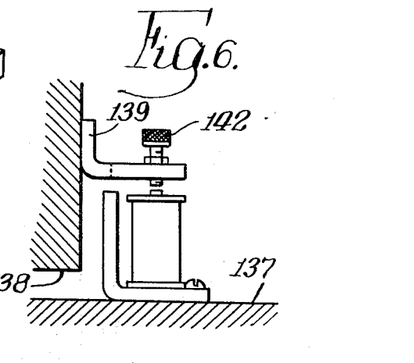
FIG. 6 is a view similar to FIG. 5 but showing an alternative form.

The arrangement of the four electromagnets associated with the four coils 94, 101, 107 and 121 is illustrated in FIGS. 4 to 6, these coils being respectively associated with the electromagnets 131, 132, 133 and 134. The four electromagnets 131 through 134 are secured in spaced relation on an angle-shaped bracket 136 made of a magnetic material such as soft iron. The bracket 136 is fastened to a stationary frame part 137 of the scale which also includes a part 138 which is fastened to the weight receiving pan of the scale. A plate 139 (FIGS. 4 and 6), also made of a magnetic material, is fastened to the part 138 immediately above the four magnets 131 through 134. The plate 139 is slit at three places indicated by the reference numeral 141 in order to divide the plate 139 into four portions, one portion being associated with and extending above each magnet. Separation of the plate 139 into four portions is important because it maintains the magnetic paths of the four magnets separated.

The electromagnets 131 through 134 exert different amounts of force when energized, and in the present illustration, the force exerted by the magnet 131 is equivalent to a weight of 0.001 pound, the force exerted by the magnet 132 is equivalent to 0.002 pounds, the force exerted by the magnet 133 is equivalent to 0.004 pounds, and the force of the magnet 134 is equivalent to 0.005 pounds. The foregoing forces may be obtained as by adjusting the amount of current flowing through the magnet coils 94, 101, 107 and 121 and this may be accomplished by suitable adjustment of the four variable resistors 92, 99, 106 and 119 (FIG. 2) provided for this purpose. However, instead of varying the current flow to obtain the desired forces, the width of the air gaps between the cores of the electromagnets and the plate 139 may be adjusted by providing a screw 142 for each magnet, as shown in FIG. 6. Manually turning a screw 142 downwardly decreases the air gap associated therewith, and of course increases the force exerted by the magnet.

Since the four electromagnets exert different forces as previously explained, the total force exerted by the magnets, operating either singly or in combination, may be adjusted to any tenth of a hundredth of a pound by selectively energizing the four magnets. Of course, no force is exerted if none of the magnets is energized. The magnetic circuits of the electromagnets of course include the bracket 136, the cores of the magnets, the air gaps between the cores and the plate 139, and the air gap between the plate 139 and the bracket 136.

As previously mentioned, at the end of a clear signal, the transistor 104 is biased on and the other three transistors are biased off, resulting in energization of the 0.004 magnet 133 and a force of 0.004 pound being added to the pan structure.

Figure 3:
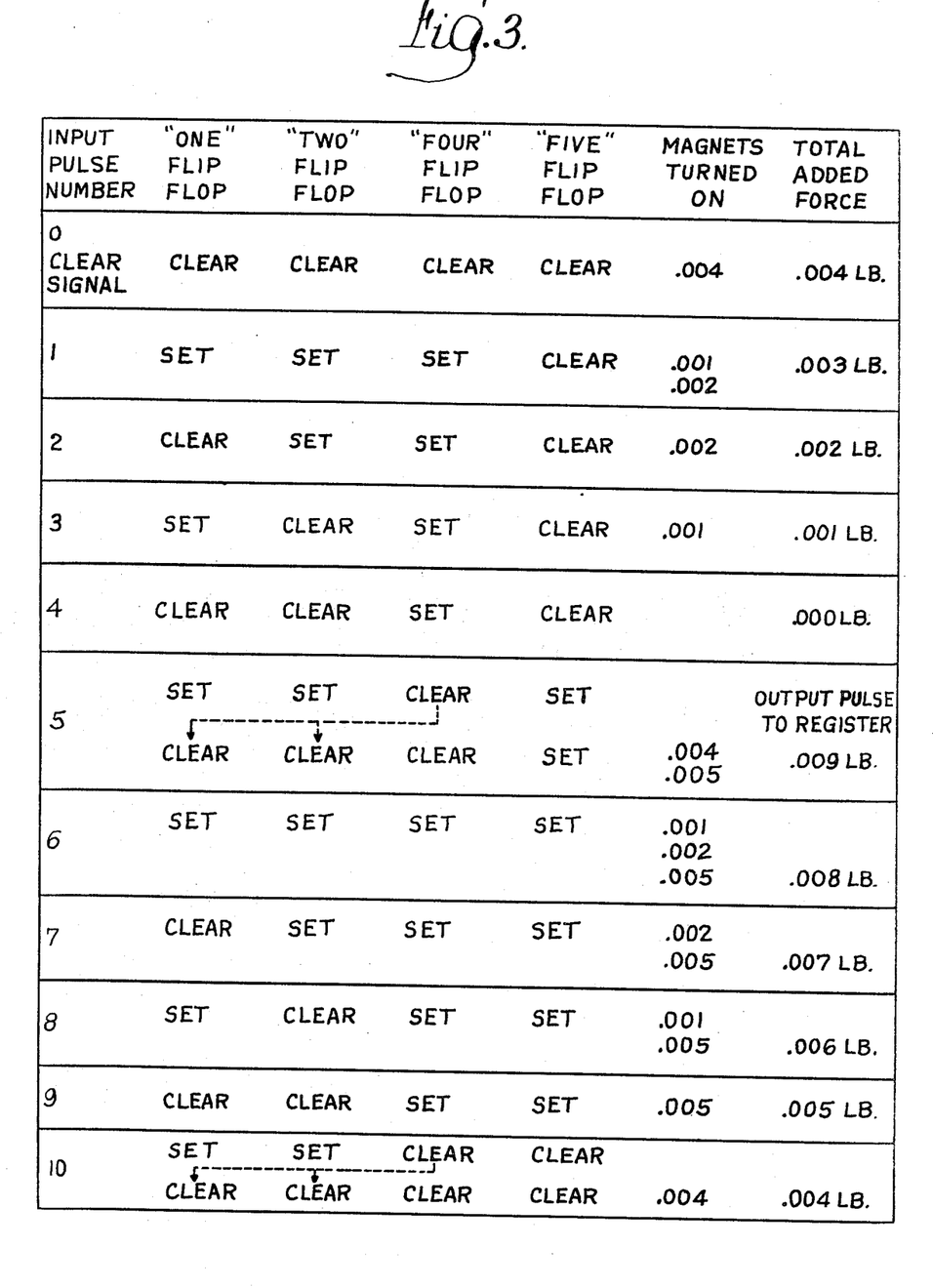
FIG. 3 is a chart showing the operation of the portion shown in FIG. 2.

The foregoing condition is illustrated in the first row of the chart shown in FIG. 3, labeled "clear signal." The first square wave from the transducer 10 passing through the gate 76 during the set zero mode of operation, toggles the flip-flop 81 on the falling edge of the square wave, resulting in setting of the flip-flop 81. Each of the flip-flops 81 to 84 is toggled only on the falling edge of a wave on its T input, and since the $\overline{Q}$ output of the flip-flop 81 was previously high in its reset state, setting of the flip-flop 81 causes a falling edge to appear at the T input of the flip-flop 82, setting the flip-flop 82. Similarly, the falling edge of the signal at the $\overline{Q}$ output of the flip-flop 82 also sets the flip-flop 83. The flip-flop 83, becoming set, causes its Q output to rise to logic one, but such a rise does not toggle the flip-flop 84, and therefore the flip-flop 84 remains in its reset or clear state. The foregoing states of the flip-flops are indicated in FIG. 3 in the second row of the chart, labeled pulse number "1."

Setting of the three flip-flops 81, 82 and 83 causes the two transistors 88 and 98 to be biased on and the transistor 104 to be biased off. Since the two transistors 88 and 98 control energization of the 0.001 and the 0.002 electromagnets, a total force of 0.003 pound is added to the weight receiving pan.

The chart shown in FIG. 3 sets forth the pattern of energization of the four electromagnets associated with the four flip-flops 81 to 84 as ten cycles are received from the transducer. An output pulse is delivered to the zero register 54 on the fifth cycle and on every tenth cycle thereafter. The condition on the receipt of the tenth cycle is the same as the condition on the receipt of the set zero pulse, and the circuit cycles through the foregoing states in every ten transducer cycles. It will be noted from the chart that at the receipt of the fifth and the tenth cycles, a forced clear occurs to the flip-flops 81 and 82. To initiate operation in the set zero mode, an operator presses a set zero switch 145 (FIG. 2) which has two connections 146 with a zero clear flip-flop 147. An output of the flip-flop 147 is connected to the conductor 124. When the switch 145 is pressed, a signal is provided on one of the two inputs 146, which sets the flip-flop 147 and its Q output becomes high. This high signal appears at the inputs 122 and 123 and resets or clears the flip-flops 83 and 84. The NOR gate 111 and the inverter 112, together, operate as an OR gate, and consequently the high signal on the conductor 124 appears at the clear inputs 108 and 109 and also clears the flip-flops 81 and 82. When the operator releases the set zero switch 145, a signal is provided on the other of the two inputs 146, which resets the flip-flop 147 and causes the signal on the conductor 124 to fall to zero for the remainder of the set zero mode.

The operation of the flip-flops 81 to 84 during receipt of the first four cycles from the transducer 10 is shown in FIG. 3. When the fifth cycle is received, the flip-flop 83 is cleared, and the flip-flops 81 and 82 are momentarily set. Clearing of the flip-flop 83 causes its $\overline{Q}$ output to become high, resulting in a negative pulse out of the NOR gate 111, a positive pulse out of the inverter 112, and clearing of the flip-flops 81 and 82. Thus, the two flip-flops 81 and 82 are only momentarily set, and they immediately shift to their clear states. As previously mentioned, a similar forced clear operation takes place on the receipt of the tenth pulse. The reason for providing a forced clear as described above is that the counter shown in FIG. 2 would have a capacity of sixteen if it were not for the two forced clears. With the two clears, the capacity is reduced to ten.

Upon the receipt of every tenth cycle or pulse from the transducer 10, one pulse appears at the output 148 of the counter, this output being connected to the Q output of the last flip-flop 84. While the circuits 19 and 34 increase the resolution by multiplying the time base by a factor of 10, the counter 69, shown in detail in FIG. 2, reduces the resolution to the normal level by dividing the transducer cycles by the same factor.

At the end of the extended time base, the signal at the input 80 of the NOR gate 76 rises to logic one and thus stops the flow of the transducer pulses to the counter.

As previously mentioned, at the beginning of a zero set operation, a total of 0.004 pound force is added to the scale pan. As the transducer 10 cycles are counted by the counter shown in FIG. 2, different amounts of force are added to the scale pan, as shown in the far right hand column in FIG. 3. The average force added to the pan during the counting operation is approximately 0.004 pounds. The average force is actually 0.0045 pounds but it is considered 0.004 pounds in the following examples. It should be kept in mind that the addition of a force to the scale pan as described will not produce an erroneous measurement during normal weighing operation. Whatever force is added is stored in the register 54 during the set zero mode. This same force continues to be added during the normal weighing mode, but it is subtracted out by operation of the coincidence detector 48 (FIG. 1) and the registers 53 and 54.

With reference again to the chart of FIG. 3, it will be noted that, when a residual count remains in the counter 67, the force exerted by the magnet is adjusted to round the count either upwardly or downwardly so that an integral number of whole cycles occurs within a time base. For example, if each cycle or pulse of the transducer 10 represents 0.01 pound during normal weighing mode, each pulse will represent 0.001 pound during the set zero mode due to the increase in resolution as previously explained.

If the transducer 10 frequency represents, for example, .247 pound without the force of the magnets, the frequency will be increased to represent 0.251 pound due to the addition of the 0.004 pound average force exerted by the magnets during the set zero mode. With the frequency represnting 0.251 pound, 25 pulses will be passed to the register 54 and a residual count of one will remain in the counter 67. At a residual count of one, the total force added by the magnets at the end of the time base will be 0.003 pound, a drop of 0.001 pound from the force added during the counting operation. This drop of 0.001 pound reduces the transducer 10 frequency by this amount causing it to correspond to 0.250 pound. The frequency is therefore adjusted so that a whole number of cycles fall within the time base.

As another example, assume that the transducer 10 frequency represents 0.252 pound without the force of the magnets, and 0.256 pound with the magnets during the set zero operation. A residual count of six remains in the counter 67 and, from the chart of FIG. 3, the force of the magnets is adjusted to add 0.008 pound. The 0.008 pound added to the 0.252 pound figure causes the signal to correspond to 0.260 pound.

By eliminating the error in setting the zero register 54, the maximum error of the system during the normal weighing mode cannot be greater than 0.005 pound, when using a counting system of the character described in the previously mentioned Sorensen application. In the Sorensen counting system, a symmetrical wave is received by the system, a time base signal is initiated in synchronism with the leading edge of a wave, and counts are made midway through each wave.

While the above error is within acceptable limits, an error of twice this amount might occur without a circuit in accordance with this invention, and this larger error may result in a total system error which is not acceptable.

Figure 7:
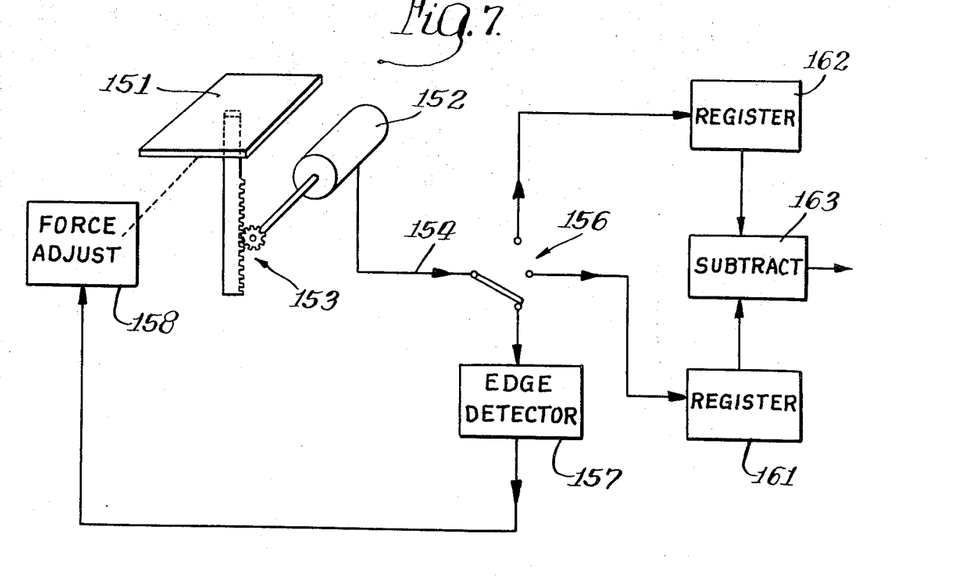
FIG. 7 is a block diagram of an alternate system embodying the invention.

FIG. 7 illustrates an alternate form of weighing system embodying the invention. The FIG. 7 system comprises a pan 151 which receives an article to be weighed, and an encoder 152 which is connected to the pan 151 through a rack and pinion 153 arrangement. The foregoing components may be of the character described in U.S. Pat. Nos. 3,262,639 and 3,329,807. Briefly, a downwardly directed force on the pan 151 causes turning movement of the shaft supporting the pinion and a code disk in the encoder attached to the shaft. The disk has alternating transparent and opaque portions arranged according to the Gray binary encoding system and the disk is positioned between a narrow slit light source and a photo diode arrangement. After an article has been placed on the pan 151 and the pan has settled, the encoder 152 produces a digital output signal on a conductor 154 in response to the code portion of the disk between the light and the photo diodes, which represents the amount of turning of the disk and the weight of the pan.

The conductor 154 is connected to a manually operable switch 156. During a set zero mode of operation, the switch 156 connects the conductor 154 to an edge detector circuit 157 which controls energization of a force adjusting device 158 such as the electromagnets previously described. The weighing system described in the foregoing patents includes a motion detector which produces a lack of motion signal when the pan 151 has settled. The circuit 157 is connected to receive the digital signal on the conductor 154 and the lack of motion signal, and it adjusts the force applied by the device 158 to turn the code disk until an edge between a transparent portion and an opaque portion is between the light source and the photo diodes. It should be apparent that the device 158 could be connected to adjust the position of the light source or the position of the photo diodes instead of being connected to the pan and the disk as illustrated. The circuit 157 may, for example, include a stepping or clock switch which is set in operation by the lack of motion signal, and which sequentially energizes the magnets to apply an increasing or decreasing amount of force. In such an arrangement, the first switch position may result in 0.001 pound force being applied, the second switch position resulting in 0.002 pound force, etc. When an edge is reached due to the gradually increasing force, the rise or fall of a pulse due to the edge may actuate, for example, a resistor-capacitor pulse shaping circuit which generates an edge pulse. The edge pulse stops operation of the stepping switch and holds the force applied by the device 158 at that value during subsequent tare setting and normal weighing operation.

After the circuit 157 and the circuit 158 have adjusted the signal on the conductor 154 as described, the operator turns the switch 156 to connect the conductor 154 to a memory register 151 which stores the digital signal produced during the set zero mode of operation. Thereafter, the operator turns the switch 156 to connect the conductor 154 to another register 162. Both registers 161 and 162 have an output connected to a subtract circuit 163 which, in each weighing operation, performs a digital subtraction of the number in the register 161 from the number in the register 162. Due to the force adjusting device 158, the number stored in the register 161 is an integral number of whole pulses or cycles, and therefore any error in the output of the subtract circuit 163 is limited to the amount of error in the digital signal received by the register 162 during each weighing operation. The output of the subtract circuit 163 may be connected to a system of the character described in the previously mentioned patents.

Thus, both the system shown in FIG. 1 and the system shown in FIG. 7 measure a parameter (weight or force) which is represented by an analog quantity (variable frequency in FIG. 1 and code disk position in FIG. 7). In the FIG. 1 system the quantity has a finite value with no weight on the scale pan, and in the FIG. 7 system the quantity has a finite value with a reference weight on the pan. In both systems, an adjusting device adjusts the parameter to eliminate errors as described.

In a number of instances in this specification, gates have been described as being turned "off" or turned "on." By being off it is meant that the gate is inhibited and by being on it is meant that the gate is enabled.

As is customary in computer systems of the character disclosed herein, a control circuit providing a reset pulse would also be necessary. In FIG. 1, for example, the register 54 must be reset or cleared prior to each zero setting operation, and the registers 53, 56 and 58 must be reset prior to each normal weighing operation.

While specific examples of the invention have been described wherein the electromagnets are arranged to exert a downwardly directed force on the pan of the scale, it will be apparent that the magnets could be arranged to exert an upwardly directed force. In either direction of the force, the weight representative frequency is adjusted to round off the count received by the zero register to the nearest full cycle.

It should also be apparent that either fluidic or electronic circuit components may be used for most of the components described herein. While the assignment of logic levels herein is the case where logic one is high and logic zero is low, a similar system may be provided with an opposite assignment of logic levels. In the latter assignment, NAND and AND components would be used in place of the NOR and OR components, respectively.

The invention described herein is highly advantageous in any system wherein an analog, or variable frequency, signal is converted to digital form, because of the continuously variable nature of an analog signal. Since the analog signal is continuously variable, it may not have an exact equivalent in digital form because the latter form is stepwise variable, or varies in discrete steps. Where the analog signal falls between two steps of a digital signal, a circuit in accordance with this invention enables rounding to the nearest full step of the digital signal. This rounding increases the accuracy of the system, which is particularly important in a weighing system.

I claim:

1. A system comprising a source of a variable frequency signal, the frequency representing a parameter and the frequency having a finite value when said parameter is zero, a source of a time base signal, first register means for counting the number of cycles of said variable frequency signal occurring during said time base signal, second register means for storing said finite value, means responsive to said variable frequency signal and to said second register means for subtracting said finite value from said variable frequency signal before said variable frequency signal is fed to said first register means, and rounding means for adjusting the frequency of said variable frequency signal upwardly or downwardly to cause said finite value to consist of an integral number of cycles of said variable frequency signal, said rounding means comprising resolution increasing means for multiplying one of said signals relative to the other, means responsive to said mulitplied signal for sensing at said increased resolution any portion of a cycle of said finite value which is not stored in said second register means, and adjusting means responsive to said portion sensing means for adjusting the frequency of said variable frequency signal to round said portion upwardly or downwardly to the nearest full cycle.

2. A circuit for reducing error in a frequency responsive system including a source of a variable frequency signal and a source of a time base signal, said system operating by counting the number of cycles of said signal occurring within a time base signal, said circuit comprising resolution increasing means connected to one of said sources for multiplying by a predetermined factor the number of said cycles occurring in a time base, circuit means connected to receive said multiplied number of cycles and determining the number of cycles in excess of an integral multiple of said factor, and adjusting means responsive to said excess for changing the frequency of said signal to substantially eliminate said excess.

3. A circuit as in claim 2, wherein said resolution increasing means multiplies the time duration of said time base signal by said factor.

4. A circuit as in claim 3, wherein said source of said time base signal comprises an oscillator and a time base circuit which responds to the frequency of said oscillator, said resolution increasing means comprising a circuit connected between said oscillator and said time base circuit for decreasing by said factor the frequency of the signal to said time base circuit.

5. A circuit as in claim 2, wherein said circuit means includes a counter having a capacity equal to said factor, said counter producing an output signal each time said counter receives a number of cycles equal to said factor, and means responsive to a residual count in said counter at the end of said time base for actuating said adjusting means, said residual count being equivalent to said excess cycles.

6. A circuit as in claim 5, wherein said factor is ten, and said counter includes four flip-flops connected to have a counting capacity of ten.

7. A circuit as in claim 6, wherein said adjusting means comprises four electromagnets, said electromagnets being energized respectively in response to the states of said flip-flops.

8. A system for measuring a parameter which is represented by an analog quantity, said quantity having a finite value when the parameter is zero, comprising zero setting means responsive to said quantity during a zero setting mode of operation and converting said quantity to a digital signal form consisting of a first plurality of pulses, said zero setting means further including adjusting means and memory means, said adjusting means being responsive to said first plurality of pulses and adjusting said parameter and thereby said analog quantity until said first plurality of pulses is an integral number of whole pulses, and said memory means storing said integral number, said system further comprising normal measuring means responsive to said quantity during a normal measuring mode of operation and converting said quantity to a digital signal form consisting of a second plurality of pulses, and means subtracting said first and second pluralities of pulses to obtain an accurate measurement of said parameter.

9. A system as in claim 8, wherein said analog quantity is the frequency of a signal.

10. A signal as in claim 8 wherein said analog quantity is the position of a movable member.

* * * * *